(12) United States Patent
Binek et al.

(10) Patent No.: US 12,072,101 B2
(45) Date of Patent: Aug. 27, 2024

(54) FUEL INJECTOR WITH SPLASH PLATE FOR AN ENGINE

(71) Applicant: Raytheon Technologies Corporation, Farmington, CT (US)

(72) Inventors: Lawrence A. Binek, Glastonbury, CT (US); Sean R. Jackson, Palm City, FL (US); Jose R. Paulino, Jupiter, FL (US); Matthew S. Dushek, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 110 days.

(21) Appl. No.: 17/675,584

(22) Filed: Feb. 18, 2022

(65) Prior Publication Data

US 2023/0266008 A1    Aug. 24, 2023

(51) Int. Cl.
*F23R 3/28* (2006.01)
*F02C 7/22* (2006.01)

(52) U.S. Cl.
CPC .............. *F23R 3/28* (2013.01); *F02C 7/222* (2013.01); *F23R 3/283* (2013.01); *F05D 2220/32* (2013.01); *F05D 2240/36* (2013.01)

(58) Field of Classification Search
CPC ........ F02C 7/222; F05D 2240/36; F23D 7/00; F23D 9/00; F23R 3/28; F23R 3/283; F23R 3/30; F23R 3/32; F23R 3/346; F23R 2900/00017; F23R 2900/00019
See application file for complete search history.

(56) References Cited

U.S. PATENT DOCUMENTS

| | | | |
|---|---|---|---|
| 3,295,325 A | 1/1967 | Nelson, Jr. | |
| 3,719,042 A | 3/1973 | Chamberlain | |
| 4,028,888 A | 6/1977 | Pilarczyk | |
| 4,398,388 A | 8/1983 | Langston, Jr. | |
| 4,898,329 A | 2/1990 | Davis | |
| 4,967,562 A | 11/1990 | Shekleton | |
| 5,140,807 A * | 8/1992 | Shekleton | F23R 3/28 60/738 |
| 6,931,862 B2 | 8/2005 | Harris | |
| 9,062,609 B2 | 6/2015 | Mehring | |
| 10,060,628 B2 | 8/2018 | Johnson | |
| 11,053,854 B1 | 7/2021 | McIntyre, II | |
| 2010/0071377 A1 | 3/2010 | Fox | |
| 2010/0229557 A1* | 9/2010 | Matsumoto | F23R 3/34 60/737 |

(Continued)

FOREIGN PATENT DOCUMENTS

JP    2004340208 A    12/2004

OTHER PUBLICATIONS

EP Search Report for EP Patent Application No. 23157406.2 dated Jul. 6, 2023.

*Primary Examiner* — Scott J Walthour
(74) *Attorney, Agent, or Firm* — Getz Balich LLC (57) ABSTRACT

An assembly is provided for an engine. This engine assembly includes an engine structure and a fuel injector. The engine structure includes an injector receptacle. The injector receptacle extends longitudinally through the engine structure along a centerline. The fuel injector is received by the injector receptacle. The fuel injector includes a fuel nozzle and a splash plate. The fuel nozzle is configured to direct fuel out of the fuel injector to impinge against the splash plate.

14 Claims, 11 Drawing Sheets

(56) References Cited

U.S. PATENT DOCUMENTS

| | | |
|---|---|---|
| 2013/0031908 A1 | 2/2013 | Dicintio |
| 2013/0104553 A1 | 5/2013 | Stoia |
| 2014/0196465 A1 | 7/2014 | Laster |
| 2014/0352312 A1 | 12/2014 | Beck |
| 2015/0211418 A1* | 7/2015 | Pidcock .................. F02C 7/222 60/739 |
| 2015/0362194 A1 | 12/2015 | Ogata |
| 2020/0332719 A1 | 10/2020 | Binek |
| 2020/0398386 A1 | 12/2020 | Binek |
| 2020/0400314 A1 | 12/2020 | Binek |

* cited by examiner

FUEL INJECTOR WITH SPLASH PLATE FOR AN ENGINE

BACKGROUND OF THE DISCLOSURE

1. Technical Field

This disclosure relates generally to fuel delivery and, more particularly, to a fuel injector for an engine.

2. Background Information

A typical gas turbine engine includes an array of fuel injectors. The fuel injectors are operable to inject fuel into a chamber of a combustor for combustion. The fuel injectors are located radially within an engine casing. Each fuel injector may be L-shaped with a radially extending support arm and an axially extending nozzle at an inner end of the support arm. The support arm is secured to the engine casing and the nozzle is mated with a respective opening in a bulkhead of the combustor. While such known fuel injectors have various benefits, these fuel injectors may be cumbersome to install and may require significant engine disassembly for fuel injector inspection, maintenance and/or replacement.

A fuel injector may be formed with a surrounding engine casing as a unitary body. While such an integral fuel injector configuration may simplify engine assembly, the fuel injector cannot be replaced without also replacing or modifying the engine casing.

There is a need in the art for a modular/replaceable fuel injector which, for example, can simplify fuel injector installation, inspection and/or replacement. There is also a need in the art for a fuel injector which can provide improved fuel dispersion and/or atomization.

SUMMARY OF THE DISCLOSURE

According to an aspect of the present disclosure, an assembly is provided for an engine. This engine assembly includes an engine structure and a fuel injector. The engine structure includes an injector receptacle. The injector receptacle extends longitudinally through the engine structure along a centerline. The fuel injector is received by the injector receptacle. The fuel injector includes a fuel nozzle and a splash plate. The fuel nozzle is configured to direct fuel out of the fuel injector to impinge against the splash plate.

According to another aspect of the present disclosure, another assembly is provided for an engine. This engine assembly includes an engine structure and a fuel injector. The engine structure includes an injector receptacle and a fuel supply passage. The injector receptacle extends longitudinally through the engine structure along a centerline. The fuel supply passage extends laterally within the engine structure to the injector receptacle. The fuel injector is mated with the injector receptacle. The fuel injector includes a nozzle passage and a nozzle orifice. The nozzle passage extends longitudinally along the centerline within the fuel injector to the nozzle orifice. The nozzle passage is fluidly coupled with the fuel supply passage. The fuel injector is configured to translate longitudinally along the centerline when mated with the injector receptacle.

According to still another aspect of the present disclosure, an apparatus is provided for an engine. This engine apparatus includes a fuel injector extending longitudinally along a centerline between a fuel injector first end and a fuel injector second end. The fuel injector includes a splash plate, a mount, a fuel nozzle, a fuel coupler and a nozzle passage. The splash plate is at the fuel injector second end. The fuel nozzle includes a nozzle orifice. The nozzle passage extends longitudinally along the centerline within the fuel injector to the nozzle orifice. The fuel nozzle is configured to direct fuel out of the fuel injector through the nozzle orifice to impinge against the splash plate. The fuel coupler is arranged longitudinally along the centerline between the mount and the fuel nozzle. The fuel coupler includes a port and an internal volume. The port extends laterally into the fuel injector to the internal volume. The internal volume is fluidly coupled with and between the port and the nozzle passage.

The fuel injector may include a splash plate. The fuel injector may be configured to receive fuel from the fuel supply passage within the nozzle passage. The fuel injector may be configured to direct the fuel out of the nozzle passage through the nozzle orifice to impinge against the splash plate.

The fuel injector may include a base and a head connected to the base. The base may project longitudinally along the centerline into the injector receptacle. The head may be abutted longitudinally against a surface of the engine structure.

The injector receptacle may include an injector aperture and a protrusion aperture. The base may project longitudinally along the centerline into injector aperture. The fuel injector may include a protrusion projecting laterally out from the base into the protrusion aperture.

The splash plate may include a planar splash plate surface. The fuel nozzle may be configured to direct the fuel out of the fuel injector to impinge against the planar splash plate surface.

The fuel nozzle may be configured to direct the fuel out of the fuel injector along a trajectory to impinge against a surface of the splash plate. The surface of the splash plate may be angularly offset from the trajectory by an obtuse angle.

The engine structure may also include a fuel supply passage extending laterally within the engine structure to the injector receptacle. The fuel injector may include a nozzle passage and a nozzle orifice in the fuel nozzle. The nozzle passage may extend longitudinally along the centerline within the fuel injector to the nozzle orifice. The nozzle passage may be fluidly coupled with the fuel supply passage.

The injector receptacle may extend longitudinally through the engine structure along the centerline between a first end and a second end. The fuel supply passage may extend laterally within the engine structure to an intermediate region of the injector receptacle located longitudinally along the centerline between the first end and the second end.

The fuel injector may be configured to be installed with and/or be removed from the engine structure completely from an exterior of the engine structure.

The fuel injector may be configured to translate longitudinally along, without rotation about, the centerline when received by the injector receptacle.

A fastener may be included. This fastener may project through a sidewall of the engine structure to secure the fuel injector to the engine structure.

The fuel injector may include a clip received within the injector receptacle. The clip may secure the fuel injector to the engine structure.

The fuel injector may include an anti-rotation feature configured to prevent rotation of the fuel injector about the centerline within the injector receptacle.

The fuel injector may include a base and a head connected to the base. The base may project longitudinally along the centerline into the injector receptacle. The head may be abutted longitudinally against a surface of the engine structure.

The fuel injector may also include a protrusion projecting laterally out from the base into an aperture in the engine structure.

The engine structure may also include a fuel supply passage extending laterally to the injector receptacle. The fuel injector may also include a fuel coupler within the injector receptacle adjacent the fuel supply passage. The fuel coupler may be configured to fluidly couple the fuel supply passage with a nozzle passage in the fuel injector.

The fuel coupler may include a tubular sidewall and a chamber within the tubular sidewall. A port may extend laterally through the tubular sidewall. The port may be at least partially aligned with an orifice to the fuel supply passage. The chamber may be fluidly coupled with and between the port and the nozzle passage.

The engine may be configured as or otherwise include a gas turbine engine. The engine structure may be configured as a case of the gas turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
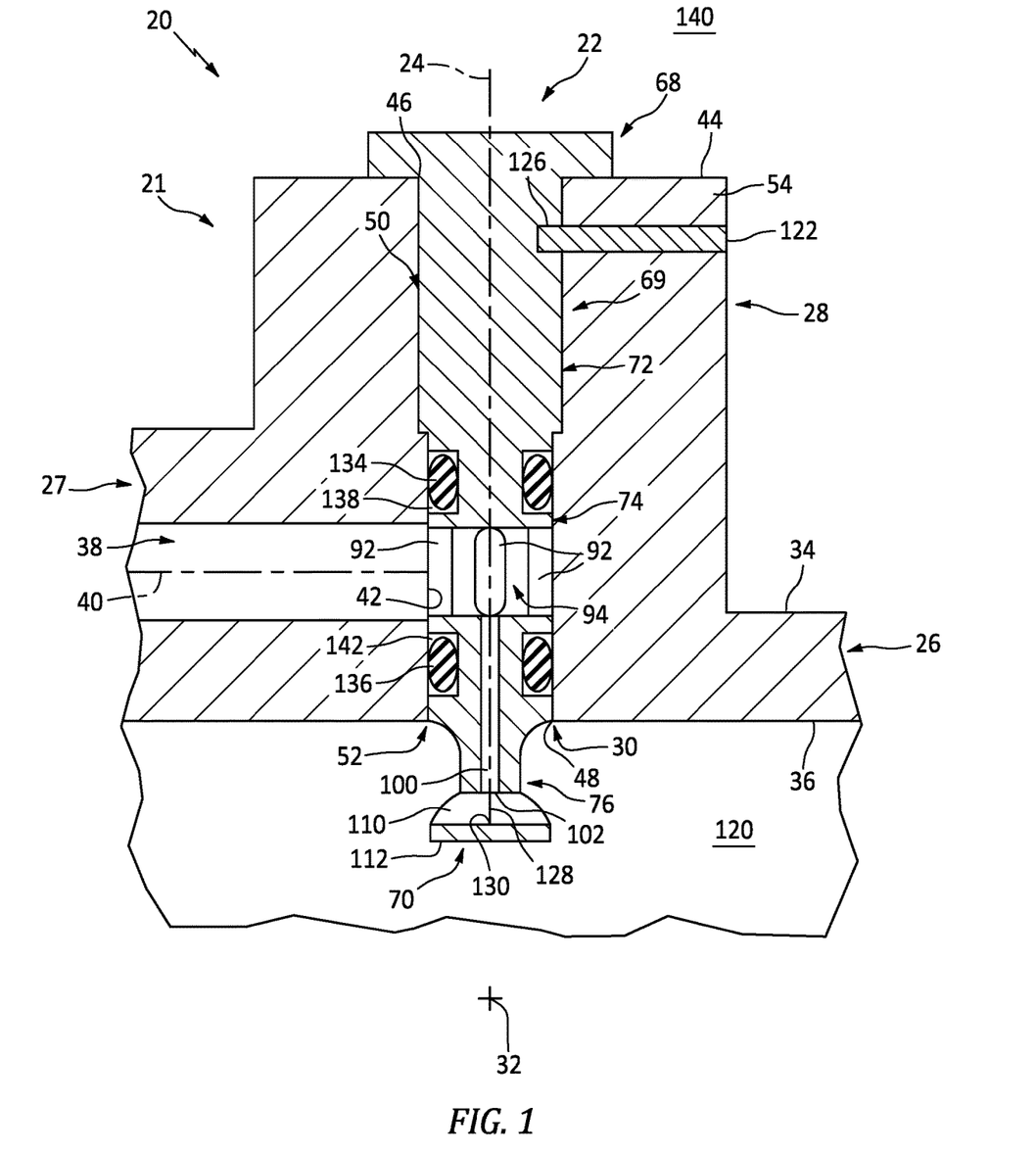
FIG. 1 is a partial cross-sectional illustration of an engine assembly.
Figure 2:
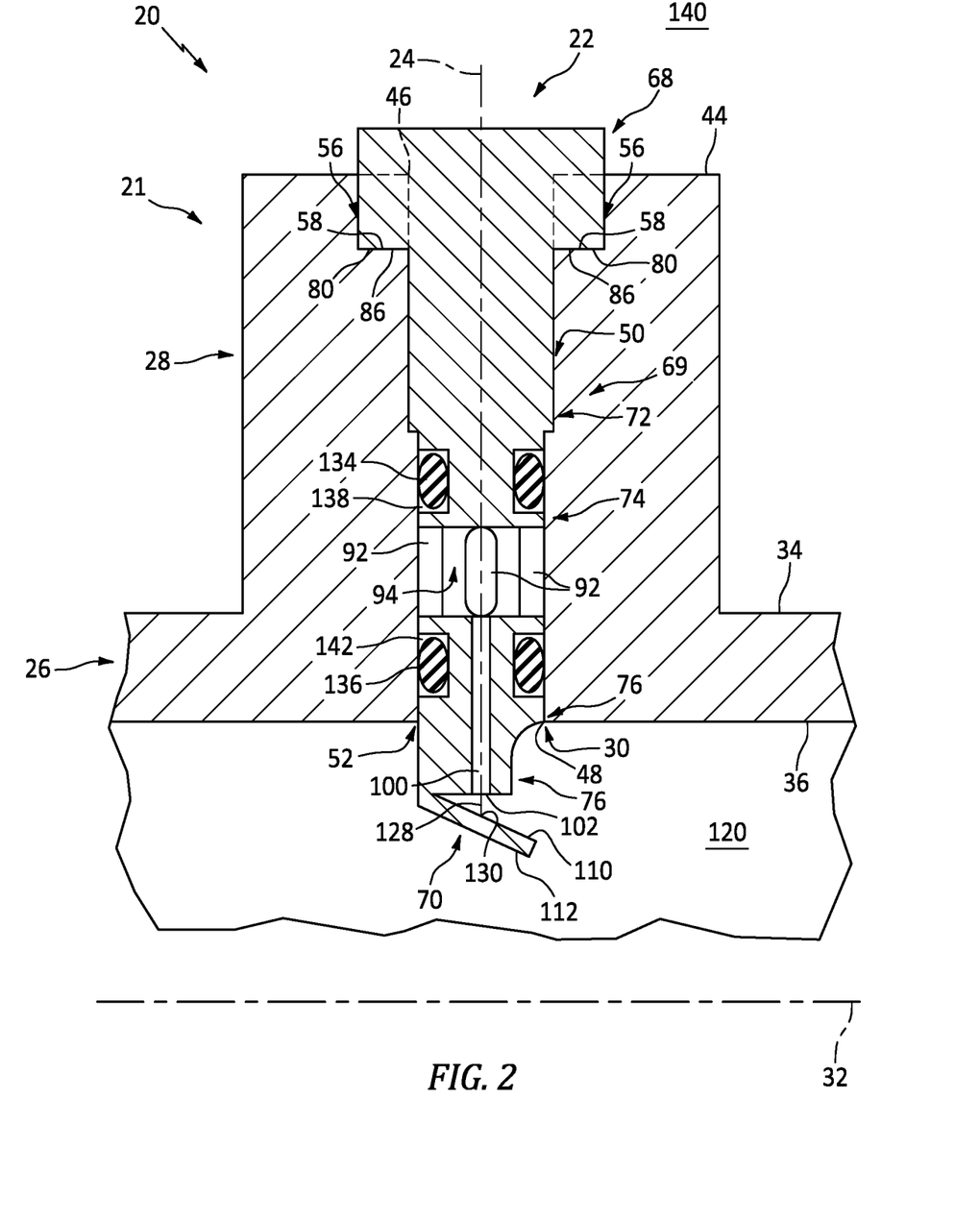
FIG. 2 is a partial side sectional illustration of the engine assembly.

FIGS. 1 and 2 are sectional illustrations of an assembly 20 for an internal combustion (IC) engine. For ease of description, this engine may be described below as a gas turbine engine. The present disclosure, however, is not limited to gas turbine engine applications. For example, the engine may alternatively be configured as a reciprocating piston engine, a rotary engine, or any other type of engine where fuel is continuously or periodically injected into chamber or another internal volume (e.g., an open space) for combustion.

Figure 13:
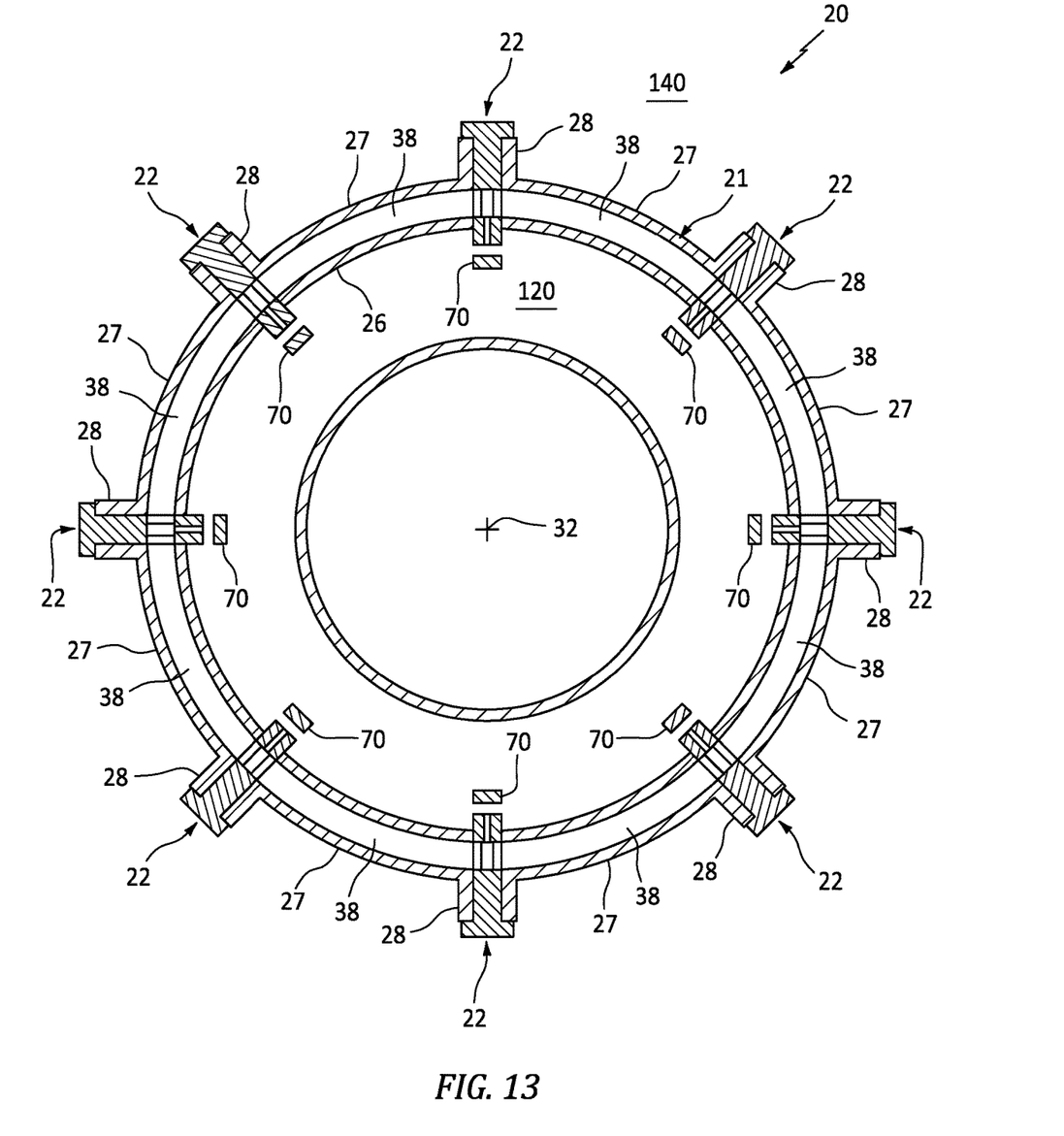
FIG. 13 is a cross-sectional illustration of the engine assembly configured with multiple fuel injectors.

The engine assembly 20 includes a static engine structure 21; see also FIG. 13. The engine assembly 20 also includes a removable/modular fuel injector 22 with a longitudinal centerline 24; e.g., a straight centerline axis.

The engine structure 21 may be configured as any stationary part of the engine that is proximate the fuel injector 22. The engine structure 21 of FIGS. 3 and 4, for example, may be configured as an engine casing such as, but not limited to, a combustor section case, a diffuser case and/or a combustor wall (e.g., a liner wall, a bulkhead wall, etc.). The engine structure 21 of FIGS. 3 and 4 includes a case wall 26, a fuel conduit 27, a fuel injector boss 28 and a fuel injector receptacle 30.

The case wall 26 may be configured as an arcuate or tubular member. The case wall 26 of FIGS. 3 and 4, for example, extends axially along a centerline axis 32 of the engine structure 21, which engine structure centerline axis 32 may be coaxial with a centerline axis and/or a rotational axis of the engine. The case wall 26 extends circumferentially about (e.g., partially or completely around) the engine structure centerline axis 32. The case wall 26 extends radially between a first (e.g., exterior, outer) side 34 of the case wall 26 and a second (e.g., interior, inner) side 36 of the case wall 26, which case wall second side 36 is radially opposite the case wall first side 34.

Figure 3:
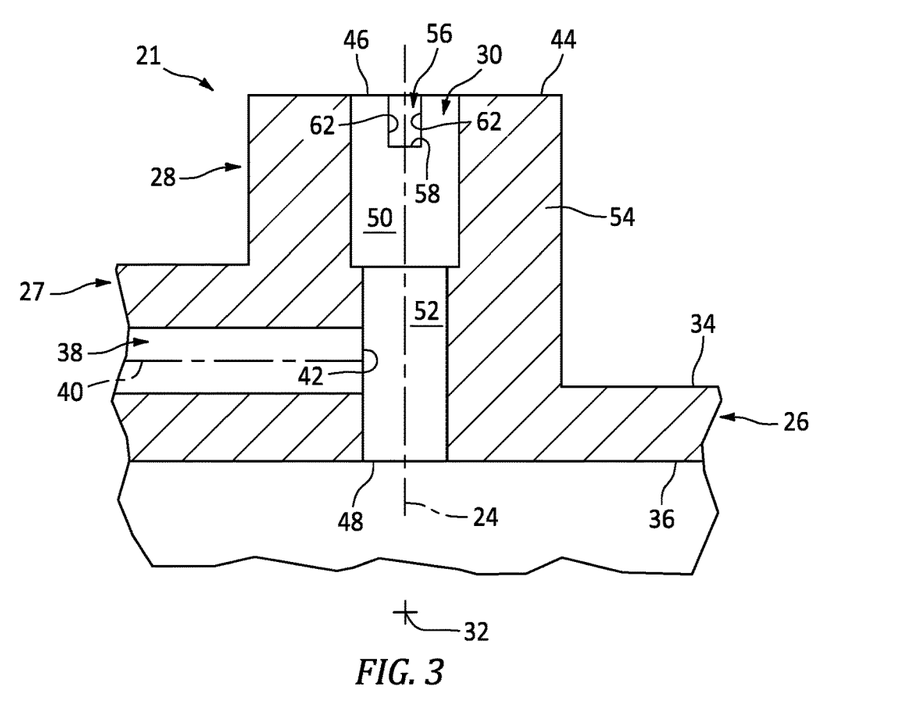
FIG. 3 is a partial cross-sectional illustration of an engine structure.

The fuel conduit 27 of FIG. 3 is configured as, or may be part of, a fuel supply for the fuel injector 22 (see FIG. 1). The fuel conduit 27, for example, may be or may be part of a fuel supply tube, a fuel inlet manifold and/or a fuel distribution manifold. The fuel conduit 27 is arranged at and/or is connected to the case wall first side 34. The fuel conduit 27 is configured with an internal fuel supply passage 38. This supply passage 38 may be formed by an internal bore and/or channel within the fuel conduit 27. The supply passage 38 extends within and/or through the fuel conduit 27 along a (e.g., curved and/or straight) centerline 40 of the supply passage 38 (laterally relative to the centerline 24) to a supply passage orifice 42, which supply passage centerline 40 may also be a centerline of the fuel conduit 27.

The injector boss 28 is configured for mounting the fuel injector 22 with the engine structure 21 (see FIGS. 1 and 2). The injector boss 28 of FIGS. 3 and 4, for example, is a tubular member configured to receive the fuel injector 22 (see FIGS. 1 and 2). The injector boss 28 is arranged at and/or is connected to the case wall first side 34. The injector boss 28 of FIGS. 3 and 4, for example, projects longitudinally out from the case wall 26 and its first side 34 along the centerline 24 to a distal end 44 of the injector boss 28.

The injector receptacle 30 may be formed by an internal aperture within the engine structure 21. The injector receptacle 30 extends longitudinally along the centerline 24 through the engine structure 21 between and to a first (e.g., exterior, outer) end 46 of the injector receptacle 30 and a second (e.g., interior, inner) end 48 of the injector receptacle 30, which receptacle second end 48 is longitudinally opposite the receptacle first end 46. The receptacle first end 46 is arranged at the injector boss distal end 44. The receptacle second end 48 is arranged at the case wall second side 36. The injector receptacle 30 of FIGS. 3 and 4 thereby extends longitudinally along the centerline 24 from the injector boss distal end 44, through the injector boss 28 and the case wall 26, to the case wall second side 36.

The injector receptacle 30 may include a receptacle counterbore 50 and a receptacle bore 52. The receptacle counterbore 50 is an untapped (e.g., smooth, cylindrical) portion of a sidewall 54 of the injector receptacle 30. The receptacle counterbore 50 is disposed at (e.g., on, adjacent or proximate) the receptacle first end 46. The receptacle counterbore 50 of FIGS. 3 and 4, for example, extends longitudinally along the centerline 24 into the engine structure 21 from the injector boss distal end 44 to the receptacle bore 52. The receptacle bore 52 is an untapped (e.g., smooth, cylindrical) portion of the receptacle sidewall 54. The receptacle bore 52 is disposed at the receptacle second end 48. The receptacle bore 52 of FIGS. 3 and 4, for example, extends longitudinally along the centerline 24 into the engine structure 21 from the case wall second side 36 to the receptacle counterbore 50. An annular shelf is formed at an interface between the receptacle counterbore 50 and the receptacle bore 52.

Figure 4:
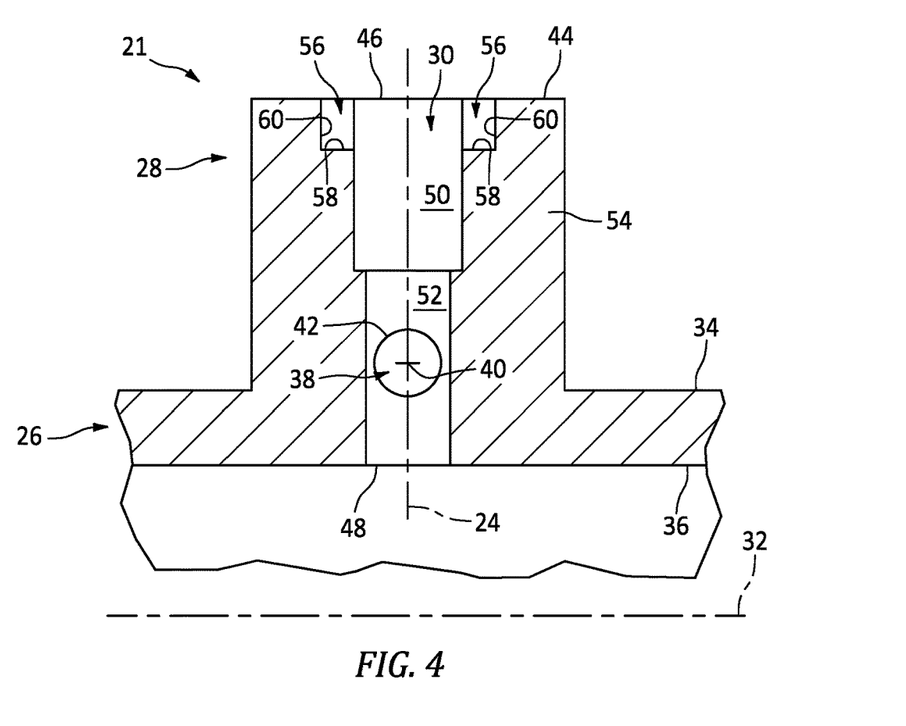
FIG. 4 is a partial side sectional illustration of the engine structure.

The injector receptacle 30 of FIGS. 3 and 4 also includes one or more receptacle apertures 56; e.g., keyways, slots, channels, notches, etc. These receptacle apertures 56 are disposed about the centerline 24; e.g., to opposing sides of the injector receptacle 30. Each of the receptacle apertures 56 projects longitudinally into the engine structure 21 (e.g., along an outer portion of the receptacle counterbore 50) from the injector boss distal end 44/the receptacle first end 46 to a longitudinal end 58 of the respective receptacle aperture 56. Each of the receptacle apertures 56 of FIG. 4 projects laterally (e.g., radially relative to the centerline 24) into the engine structure 21 from the receptacle counterbore 50 to a lateral end 60 of the respective receptacle aperture 56. Each of the receptacle apertures 56 of FIG. 3 extends circumferentially within the engine structure 21 between opposing circumferential sides 62 of the respective receptacle aperture 56.

The passage orifice 42 is disposed along an intermediate region of the injector receptacle 30. The passage orifice 42, for example, is located longitudinally (e.g., midway) between the receptacle first end 46 and the receptacle second end 48 along the centerline 24. The passage orifice 42 of FIGS. 3 and 4, in particular, is disposed in a portion of the receptacle sidewall 54 along the receptacle bore 52. The supply passage 38 is thereby fluidly coupled with the injector receptacle 30 and its receptacle bore 52.

Figure 5:
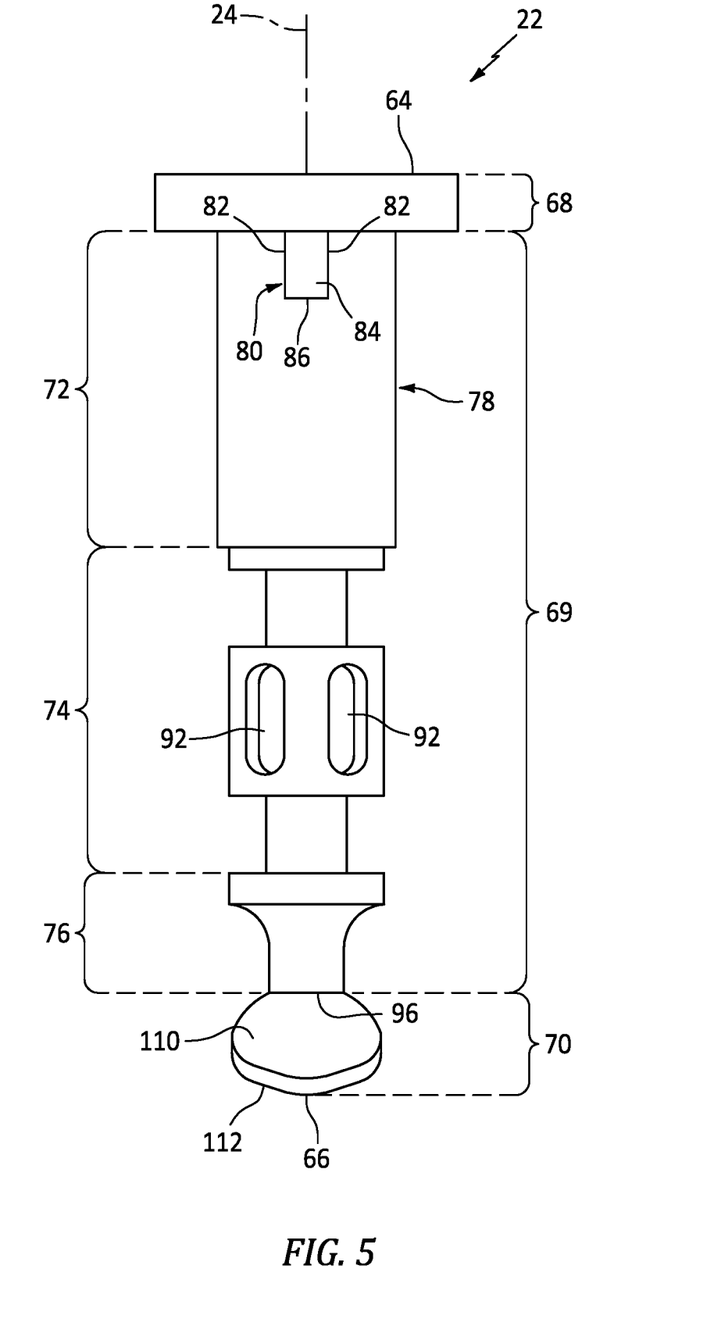
FIG. 5 is a side illustration of a fuel injector.

Referring to FIG. 5, the fuel injector 22 may be configured as a fuel injector plug. The fuel injector 22 of FIG. 5, in particular, extends longitudinally along the centerline 24 between and to a first (e.g., exterior, outer) end 64 of the fuel injector 22 and a second (e.g., interior, inner) end 66 of the fuel injector 22, which injector second end 66 is longitudinally opposite the injector first end 64. The fuel injector 22 of FIG. 5 includes a fuel injector head 68, a fuel injector base 69 and a splash plate 70, where the injector head 68 may be a head of the fuel injector plug and the injector base 69 (and the splash plate 70) may be a shank of the fuel injector plug.

The injector head 68 is connected to the injector base 69 and arranged at the injector first end 64. The injector base 69 projects longitudinally along the centerline 24 from the injector head 68 to the splash plate 70 at the injector second end 66. The injector base 69 of FIG. 5 includes a fuel injector mount 72, a fuel injector fuel coupler 74 and a fuel injector fuel nozzle 76.

The injector mount 72 is longitudinally between and connected to the injector head 68 and the fuel coupler 74. The injector mount 72 of FIG. 5, for example, extends longitudinally along the centerline 24 between and to the injector head 68 and the fuel coupler 74. The injector mount 72 may be a solid portion of the fuel injector 22; see also FIG. 6. The injector mount 72, for example, may be configured without any pathways through which fluid (e.g., fuel) may to travel (e.g., laterally and/or longitudinally) thereacross. More particularly, the fuel injector 22 of FIG. 5 is configured without any apertures, bores, channels, etc. extending laterally and/or longitudinally through the injector mount 72.

Figure 7:
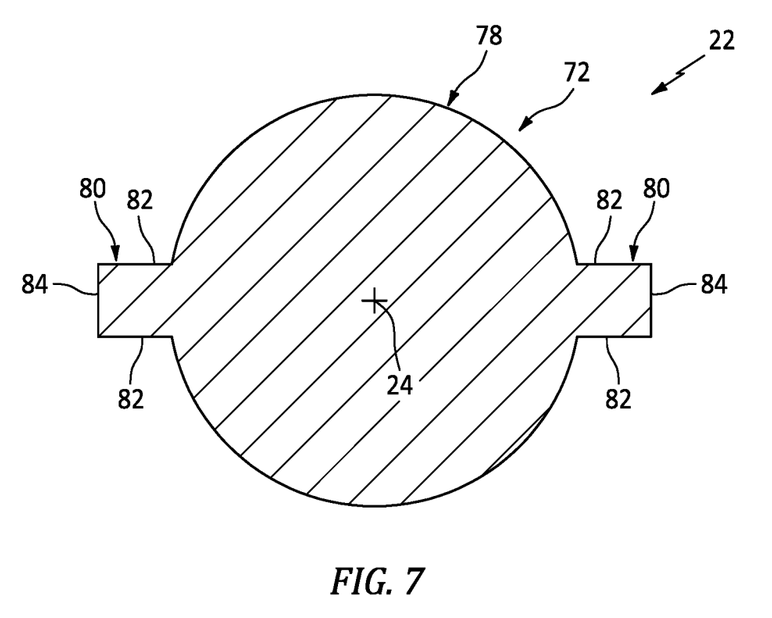
FIG. 7 is a cross-sectional illustration through a mount of the fuel injector.

The injector mount 72 of FIG. 5 includes an (e.g., cylindrical) injector mount base 78 and one or more injector mount protrusions 80 (see also FIG. 7); e.g., tabs, flanges, locators and/or anti-rotation features. The mount base 78 extends longitudinally between and is connected to the injector head 68 and the fuel coupler 74. Referring to FIG. 7, the mount protrusions 80 are arranged circumferentially about the mount base 78 and the centerline 24; e.g., to opposing sides of the fuel injector 22. Each of the mount protrusions 80 is connected to the mount base 78. Each of the mount protrusions 80 extends circumferentially between opposing circumferential sides 82 of the respective mount protrusion 80. Each of the mount protrusions 80 projects laterally (e.g., radially relative to the centerline 24) out from an (e.g., cylindrical) outer surface of the mount base 78 to a distal lateral end 84 of the respective mount protrusion 80. Referring to FIG. 5, each of the mount protrusions 80 is further connected to the injector head 68, and projects longitudinally out from the injector head 68 (e.g., along the mount base 78) to a distal longitudinal end 86 of the respective injector mount 72.

Figure 6:
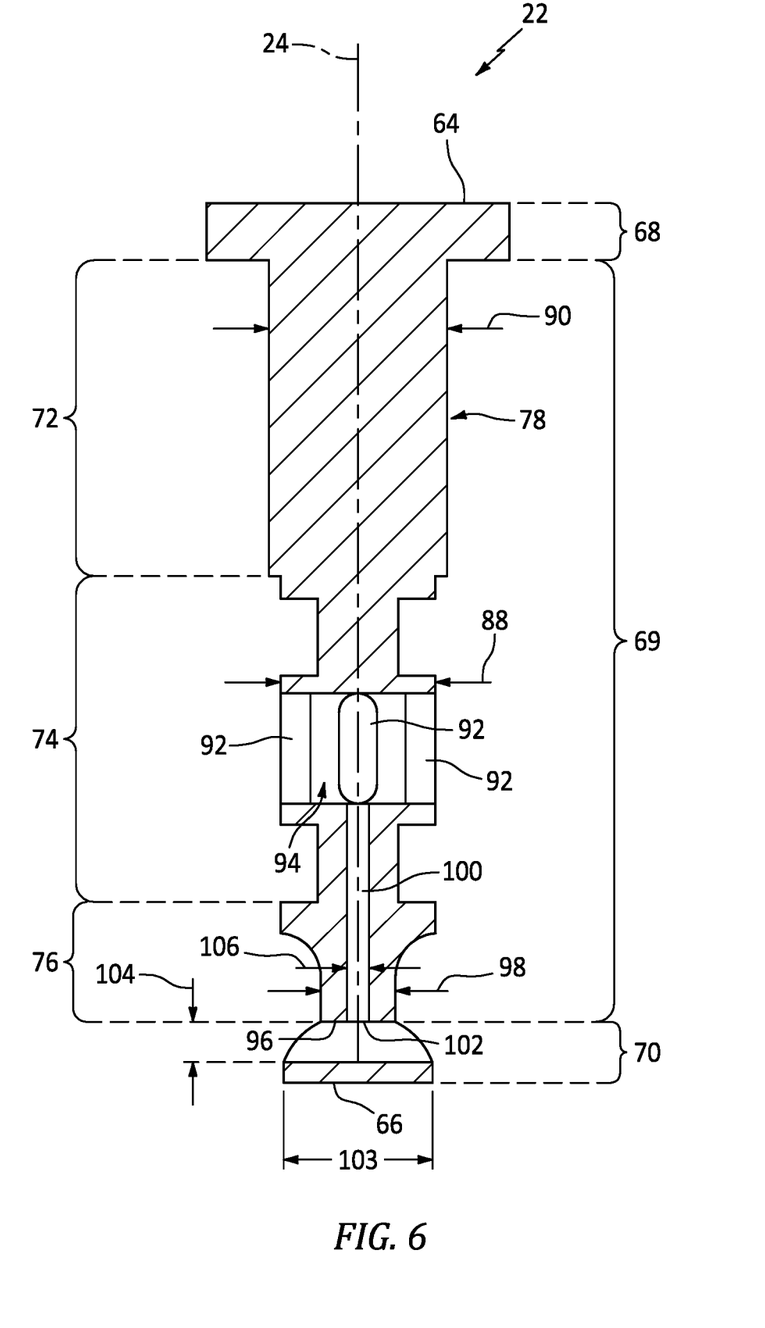
FIG. 6 is a side sectional illustration of the fuel injector.

Referring to FIG. 6, the fuel coupler 74 is longitudinally between and connected to the injector mount 72 and the fuel nozzle 76. The fuel coupler 74 of FIG. 6, for example, extends longitudinally along the centerline 24 between and to the injector mount 72 and the fuel nozzle 76. The fuel coupler 74 is configured with a lateral width 88 (e.g., a diameter) that is less than a lateral width 90 (e.g., a diameter) of the injector mount 72 and its mount base 78.

Figure 8:
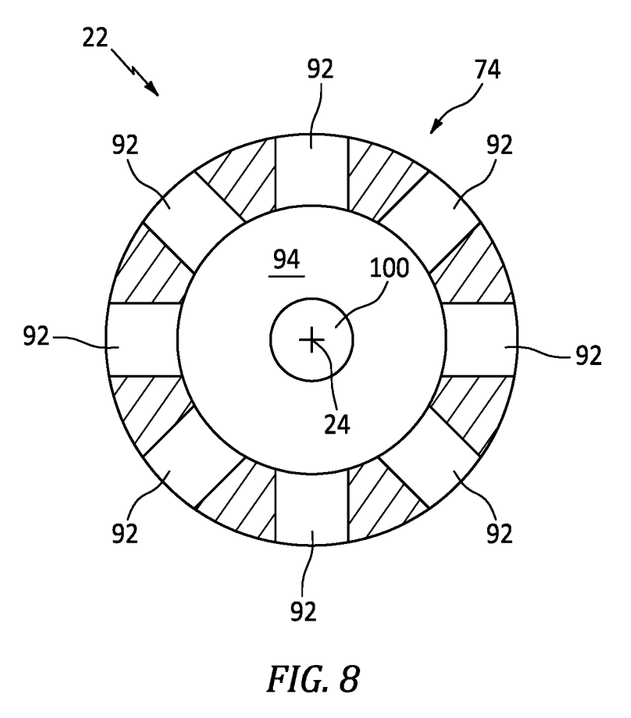
FIG. 8 is a cross-sectional illustration through a fuel coupler of the fuel injector.

The fuel coupler 74 includes one or more ports 92 (e.g., apertures, windows, pass-throughs, etc.) and an internal volume 94 (e.g., a plenum, a chamber, etc.). Referring to FIG. 8, the ports 92 are arranged circumferentially about the centerline 24. Each port 92 provides a flowpath from an exterior of the fuel coupler 74 into the internal volume 94. Each port 92 of FIG. 8, for example, projects laterally (e.g., radially relative to the centerline 24) into the fuel coupler 74 from the exterior of the fuel coupler 74 to the internal volume 94. The internal volume 94 is laterally and longitudinally within the fuel coupler 74. The internal volume 94, for example, may be an internal bore within the fuel coupler 74.

Referring to FIG. 6, the fuel nozzle 76 is connected to the fuel coupler 74. The fuel nozzle 76 of FIG. 6, for example, projects longitudinally along the centerline 24 from the fuel coupler 74 to a distal end 96 (e.g., a tip) of the fuel nozzle 76 proximate the injector second end 66. The fuel nozzle 76 is configured with a lateral width 98 (e.g., a diameter) that is different (e.g., less) than the coupler lateral width 88 at the distal end 96; however, the present disclosure is not limited thereto.

The fuel nozzle 76 is configured with a nozzle passage 100 (e.g., a fuel passage) and a nozzle orifice 102. An internal bore of the fuel injector 22 at least partially (or completely) forms the nozzle passage 100. The nozzle passage 100 and its internal bore extend longitudinally along the centerline 24 from the internal volume 94 within the fuel coupler 74 to the nozzle orifice 102 at the distal end 96 (e.g., tip) of the fuel nozzle 76. The nozzle passage 100 may thereby extend longitudinally along the centerline 24 out of the fuel coupler 74 and then through the fuel nozzle 76 to the nozzle orifice 102. The nozzle orifice 102 provides an outlet from the nozzle passage 100 and, more generally, from the fuel injector 22 and its fuel nozzle 76.

Figure 9:
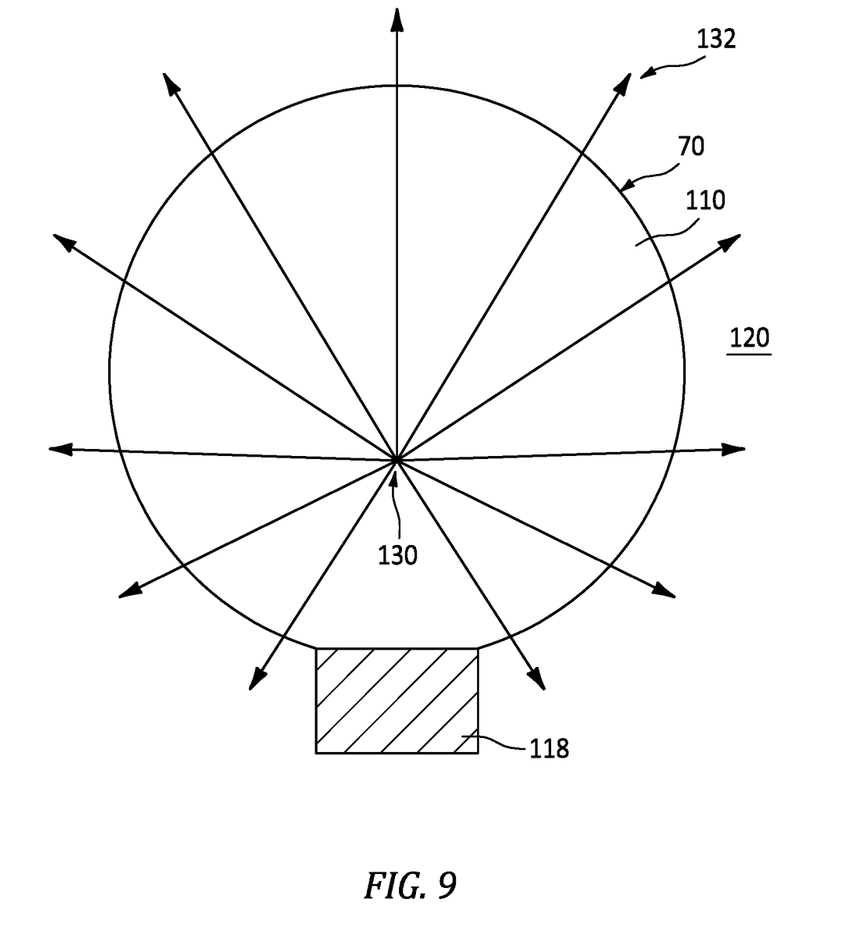
FIG. 9 is a cross-sectional illustration of the fuel injector at a splash plate depicting dispersion of fuel against the splash plate.

The splash plate 70 of FIG. 6 has a lateral width 103. This lateral width 103 may be equal to or different (e.g., less) than the coupler lateral width 88. The splash plate 70 of FIGS. 5 and 6 is configured to redirect (e.g., disperse) fuel directed out of the fuel injector 22 and its fuel nozzle 76 into a disperse (e.g., a widespread) pattern 132, for example, as shown in FIG. 9. The splash plate 70 of FIG. 6, for example, is arranged proximate and laterally overlaps the nozzle orifice 102. The splash plate 70 is longitudinally spaced from the fuel nozzle 76 and its nozzle orifice 102 by a longitudinal distance 104 along the longitudinal centerline 24. This longitudinal distance 104 may be equal to or different (e.g., greater or less) than a width 106 (e.g., diameter) of the nozzle passage 100 and/or the nozzle orifice 102. The longitudinal distance 104 of FIG. 6, for example, is between one-half times ($0.5x$) and ten times ($10x$) a width (e.g., a diameter) of the nozzle passage 100 and its nozzle orifice 102. The present disclosure, however, is not limited to the foregoing exemplary dimensional relationship between the splash plate 70 and the fuel nozzle 76.

Figure 10:
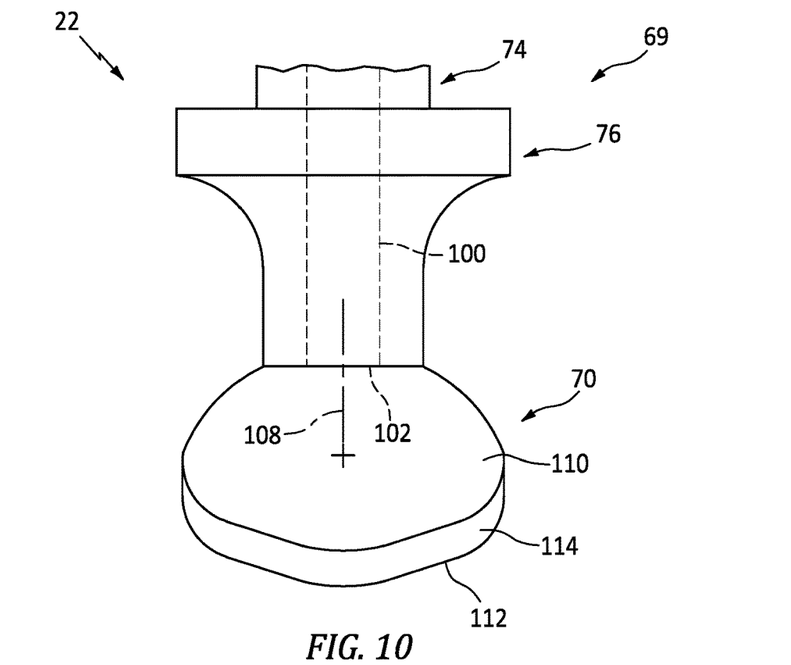
FIG. 10 is a partial side illustration of the fuel injector proximate the splash plate.
Figure 11:
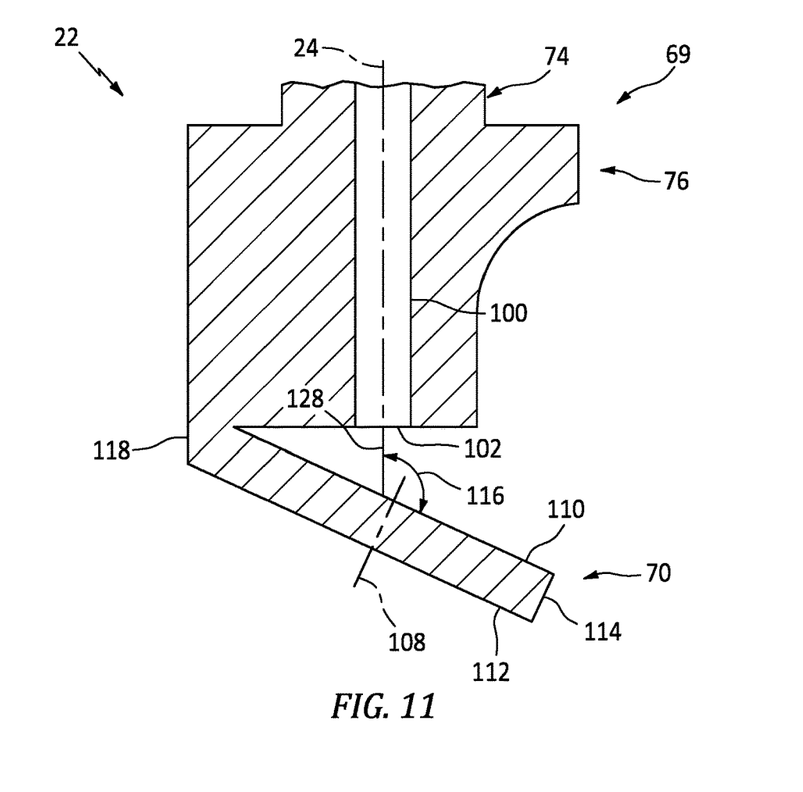
FIG. 11 is a side sectional illustration of the fuel injector proximate the splash plate.

The splash plate 70 of FIGS. 10 and 11 is configured with a (e.g., circular) puck-like body. The splash plate 70 of FIGS. 10 and 11, for example, extends axially along a centerline axis 108 of the splash plate 70 between a frontside splash plate surface 110 and a backside splash plate surface 112, which backside splash plate surface 112 is axially opposite the frontside splash plate surface 110. Each of these splash plate surfaces 110, 112 may have a generally circular shape. However, in other embodiments, one or more of the splash plate surfaces 110, 112 may each have a non-circular (e.g., oval, polygonal, etc.) shape. Each of the splash plate surfaces 110, 112 may be configured as a smooth and/or planar surface. However, in other embodiments, one or more of the splash plate surfaces 110, 112 may each be configured as a non-planar (e.g., concave, convex, etc.) surface and/or with one or more flow disruptions; e.g., apertures or projections. The splash plate 70 of FIGS. 10 and 11 also includes at least one side perimeter surface 114 that extends axially between the opposing splash plate surfaces 110 and 112 and circumferentially about the centerline axis 108 of the splash plate 70.

Referring to FIG. 11, the splash plate 70 and, more particularly, its frontside splash plate surface 110 is angularly offset from the longitudinal centerline 24 and/or fuel trajectory 128 (discussed below) by an angle 116 when viewed, for example, in the plane of FIG. 11; e.g., a plane that laterally bisects one or more or each of the components 69 and 70 and/or is parallel with and coincident with the centerline 24 and the axis 108. This angle 116 may be an obtuse angle. The angle 116 of FIG. 11, for example, is between one-hundred degrees (100°) and one-hundred and fifty degrees (150°); e.g., substantially (e.g., +/−2°) or exactly equal to one-hundred and twenty degrees (120°). The present disclosure, however, is not limited to such exemplary angles. In other embodiments, for example, the angle 116 may be less than one-hundred degrees (100°) or greater one-hundred and fifty degrees (150°).

The splash plate 70 of FIG. 11 may be connected to the fuel nozzle 76 by at least (or only) one support member 118. The support member 118 may be configured as a beam and/or a pylon. The support member 118 of FIG. 11, for example, has an elongated body that is connected to and extends between the fuel nozzle 76 and the splash plate 70. Of course, in other embodiments, the splash plate 70 may be connected directly to the fuel nozzle 76 without any additional members.

Referring to FIG. 2, the fuel injector 22 is mated with, inserted into and/or otherwise received by the injector receptacle 30. For example, during assembly, the splash plate 70 and the fuel nozzle 76 are inserted longitudinally into the injector receptacle 30 at the receptacle first end 46. The splash plate 70 and the fuel nozzle 76 are moved (e.g., translated) longitudinally along the centerline 24 through the receptacle counterbore 50 and into the receptacle bore 52. Each of the mount protrusions 80 is mated with, inserted into and/or otherwise received by a respective one of the receptacle apertures 56. The splash plate 70 and the fuel nozzle 76 are further moved (e.g., translated) longitudinally along the centerline 24 through and out of the receptacle counterbore 50 into a plenum 120. This plenum 120 may be within the engine structure 21 and adjacent the case wall second side 36. The fuel injector 22 may be moved (e.g., translated) along the centerline 24 until, for example, the injector head 68 longitudinally engages (e.g., contacts) the boss distal end 44 directly (or indirectly through an intermediate member; e.g., a spacer). In this position, referring now to FIG. 1, the fuel injector 22 may be secured to the engine structure 21 and, more particularly, the injector boss 28 via at least (or only) one fastener 122; e.g., a bolt, a set screw, etc. The fastener 122 of FIG. 1, for example, projects laterally through the sidewall 54 of the injector boss 28 and into a fastener aperture 126 (e.g., a blind hole) in the injector mount 72 and its mount base 78. The fuel injector 22 is thereby removably attached to the engine structure 21.

Following mating of the mount protrusions 80 of FIG. 2 with the receptacle apertures 56, the mount protrusions 80 may guide the longitudinal movement (e.g., translation) of the fuel injector 22 along the centerline 24. The mount protrusions 80 may also rotationally locate and lock a position of the splash plate 70 about the centerline 24. The mount protrusions 80 may thereby prevent or otherwise restrict rotation of the fuel injector 22 about the centerline 24 as the fuel injector 22 moves (e.g., translates) longitudinally along the centerline 24 within the injector receptacle 30.

In the assembled position of FIG. 1, the passage orifice 42 is aligned with the fuel coupler 74 and at least one of its ports 92. One of the ports 92 for example, may at least partially (or completely) longitudinally overlap and may at least partially (or completely) circumferentially overlap the passage orifice 42 to provide a (e.g., unobstructed, or only partially obstructed) fluid coupling between the supply passage 38 and the internal volume 94.

The injector mount 72 and/or the fuel coupler 74 may be arranged completely within the injector receptacle 30. The fuel nozzle 76 may be arranged (e.g., partially or completely) within and/or outside of the injector receptacle 30. More particularly, the fuel nozzle 76 of FIGS. 1 and 2 projects longitudinally out from the injector receptacle 30, away from the case wall second side 36 and into the plenum 120 (e.g., an air passage) within the engine structure 21.

With the above configuration, the fuel injector 22 may be installed with the engine structure 21 and removed from the engine structure 21 from an exterior of the engine structure 21. Assembly personnel, maintenance personnel and/or inspection personnel may thereby install, replace and/or service the fuel injector 22 without requiring disassembly and/or removal of the engine structure 21 nor access to an interior of the engine structure 21. Fuel injectors with, for example, different fuel coupler configurations, fuel nozzle configurations, etc. may be more easily swapped. The plug-and-play operation of the fuel nozzle 76 reduces complexity of the fuel delivery system. For example, a single step of mating the fuel injector 22 with the engine structure 21 may (A) fluidly couple the fuel injector 22 with the fuel conduit 27 as well as (B) position the fuel nozzle 76 and the splash plate 70 for operation. Configuring the fuel injector 22 as a single, unitary body (e.g., a monolithic body) may facilitate proper positioning (e.g., spacing, angling, etc.) of the splash plate 70 with respect to the nozzle orifice 102. Furthermore, configuring the splash plate 70 as part of the fuel injector 22 facilitates inspection of the splash plate 70 by simply removing the fuel injector 22; e.g., without use of a borescope and/or other inspection systems.

Referring to FIG. 1, during turbine engine operation, fuel is directed into the supply passage 38 from a fuel source (not shown). At least a portion (or all) of the fuel within the supply passage 38 is directed into the nozzle passage 100. This fuel flows through the nozzle passage 100 and out of the fuel nozzle 76 through the nozzle orifice 102 and into a spatial gap between the fuel nozzle 76 and the splash plate 70 as a fuel jet along a fuel jet trajectory 128, which may be parallel (e.g., coaxial) with the centerline 24. This fuel jet may be a linear concentrated flow/stream of fuel versus, for example, a spread-out pattern of fuel such as a conical film of fuel. The fuel jet flows through the spatial gap along its trajectory 128 and impacts (e.g., impinges against) the frontside splash plate surface 110 at a target area 130; e.g., an impingement area. Referring to FIG. 9, upon impacting the frontside splash plate surface 110, the splash plate 70 redirects (e.g., disperses) the impinging fuel jet radially outward (relative to the fuel jet trajectory 128) into a (e.g., uniform and/or symmetrical) disperse radiant pattern 132 (e.g., an arcuate and/or a generally planar film; schematically shown in FIG. 9 via discrete flow arrows). The fuel may thereby be more evenly dispersed/spread/mixed into fluid (e.g., air) flowing past the fuel nozzle 76 and the splash plate 70 within the plenum 120. Providing such relatively even mixing of the fuel and the fluid may in turn increase fuel burn efficiency and/or reduce likelihood of carbon formation within the turbine engine.

In some embodiments, referring to FIG. 1, the fuel injector 22 may be configured with one or more annular seal elements 134 and 136. Each seal element 134, 136 may be configured as a ring seal such as, but not limited to, an O-ring element, a C-seal element, a crush seal element, a washer, etc. The ports 92 and the passage orifice 42 of FIG. 1 are positioned longitudinally along the centerline 24 between the first (e.g., outer) seal element 134 and the second (e.g., inner) seal element 136.

The first seal element 134 is seated in an annular first (e.g., outer) seal receptacle 138 (e.g., a notch, a groove, a channel, etc.) in the injector base 69. The first seal receptacle 138 of FIG. 1, in particular, is located in an outer portion of the fuel coupler 74. However, in other embodiments, the first seal receptacle 138 may be located in an inner portion of the injector mount 72, or in another portion of the fuel injector 22 and its injector base 69 longitudinally between the fuel coupler 74 and the injector mount 72.

The first seal element 134 is laterally engaged with the injector base 69 and the receptacle sidewall 54 in the receptacle bore 52. The first seal element 134 may thereby form a seal interface between the fuel injector 22 and the engine structure 21 such that the fuel, for example, does not leak (e.g., in an outward direction; vertically up in FIG. 1) between the engine assembly elements 21 and 22 into an external plenum 140.

The second seal element 136 is seated in an annular second (e.g., inner) seal receptacle 142 (e.g., a notch, a groove, a channel, etc.) in the injector base 69. The second seal receptacle 142 of FIG. 1, in particular, is located in an inner portion of the fuel coupler 74. However, in other embodiments, the second seal receptacle 142 may be located in an outer portion of the fuel nozzle 76, or in another portion of the fuel injector 22 and its injector base 69 longitudinally between the fuel coupler 74 and the fuel nozzle 76.

The second seal element 136 is laterally engaged with the injector base 69 and the receptacle sidewall 54 in the receptacle bore 52. The second seal element 136 may thereby form a seal interface between the fuel injector 22 and the engine structure 21 such that the fuel, for example, does not leak (e.g., in an inward direction; vertically down in FIG. 1) between the engine assembly elements 21 and 22 into the internal plenum 120.

Figure 12:
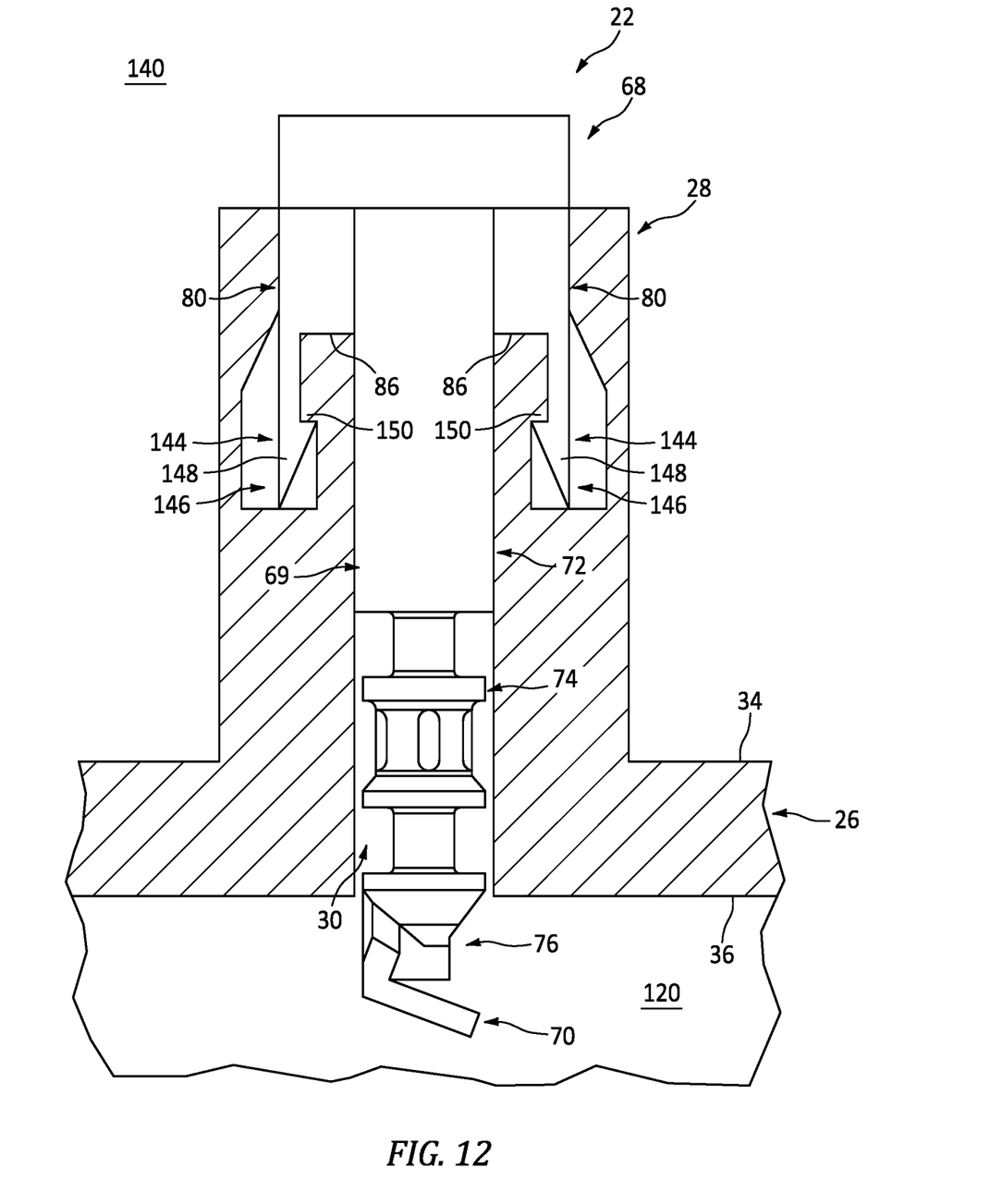
FIG. 12 is a partial side cutaway illustration of the engine assembly where one or more clips secure the fuel injector to the engine structure.

The fuel injector 22 of FIG. 1 is described above as being secured to the engine structure 21 by the fastener 122. The fuel injector 22, of course, may also or alternatively be secured to the engine structure 21 via one or more techniques. For example, the fuel injector 22 may also or alternatively be welded, brazed and/or otherwise bonded to the engine structure 21. Referring to FIG. 12, the fuel injector 22 may also or alternatively be secure to the engine structure 21 by one or more clips 144. Each clip 144 of FIG. 12 is formed as an extension of a respective one of the mount protrusions 80. More particularly, each clip 144 of FIG. 12 projects longitudinally out from and is cantilevered from the respective mount protrusion 80 at its longitudinal end 86. When the fuel injector 22 is being mated with the injector receptacle 30, each clip 144 may project into a clip receptacle 146, where a barb 148 on the clip 144 may engage a catch 150. Of course, various other securement devices may also or alternatively be used for temporarily or permanently securing the fuel injector 22 to the engine structure 21.

In some embodiments, referring to FIG. 13, the engine assembly 20 may include a plurality of the fuel injectors 22. These fuel injectors 22 may be arranged circumferentially about the engine structure centerline axis 32 in, for example, an annular array. Each of the fuel injectors 22 may be configured as described above. The engine structure 21 may also be generally configured as described above. However, the engine structure 21 may include a plurality of the fuel conduits 27 and a plurality of the injector bosses 28, where each injector boss 28 is configured to mount a respective one of the fuel injectors 22 with the engine structure 21.

The fuel conduits 27 may be configured to collectively form a fuel supply (e.g., a manifold) for the fuel injectors 22. Each fuel conduit 27 of FIG. 13, for example, is arranged between a respective circumferentially adjacent pair of the fuel injectors 22. Each injector boss 28 may be arranged circumferentially between and connected to respective circumferentially adjacent pair of the fuel conduits 27. Thus, each injector receptacle 30 (see FIGS. 1 and 2) and the respective fuel injector 22 received therein is fluidly coupled with a respective pair of the supply passages 38.

In some embodiments, referring to FIGS. 1 and 2, each fuel injector 22 may be configured as a monolithic body. Each fuel injector 22 and its elements 68, 70, 72, 74 and 76, for example, may be additively manufactured, cast, machined and/or otherwise forms as a single integral, unitary body. The engine structure 21 may also or alternatively be configured as a monolithic body. The engine structure 21 of FIGS. 1, 2 and 13, for example, and each of its elements 26, 27 and 28 may be additively manufactured, cast, machined and/or otherwise formed as a single integral, unitary body. By contrast, a non-monolithic body may include parts that are discretely formed from one another, where those parts are subsequently mechanically fastened and/or otherwise attached to one another.

Figure 14:
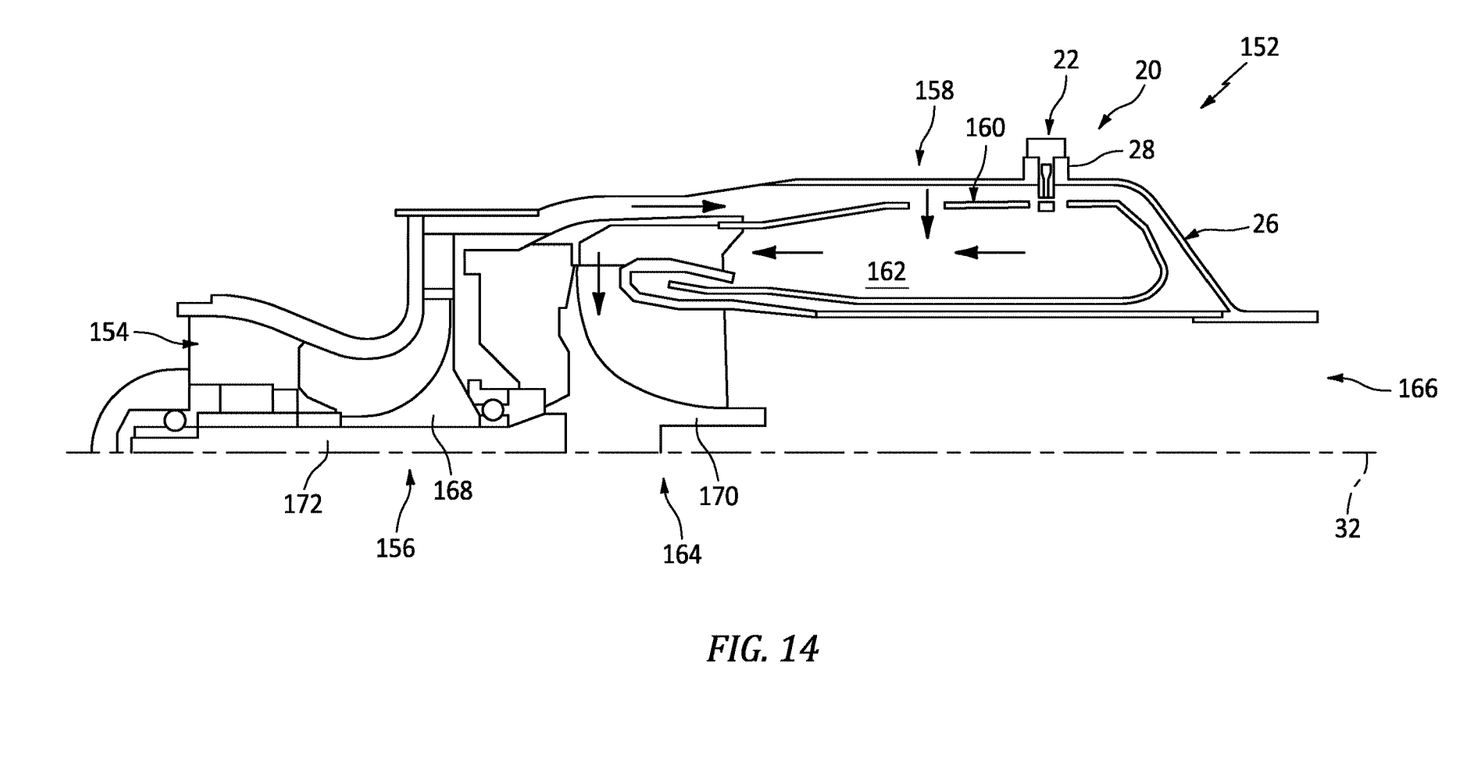
FIG. 14 is a side schematic illustration of a gas turbine engine configured with the engine assembly.

FIG. 14 schematically illustrates a single spool, radial-flow turbojet turbine engine 152 with which the engine assembly 20 may be included. This turbine engine 152 may be configured for propelling an unmanned aerial vehicle (UAV), a drone, or any other manned or unmanned aircraft or self-propelled projectile. In the specific embodiment of FIG. 14, the turbine engine 152 includes an upstream inlet 154, a (e.g., radial) compressor section 156, a combustor section 158 with a (e.g., annular) combustor 160 and a (e.g., annular) combustion chamber 162, a (e.g., radial) turbine section 164 and a downstream exhaust 166 fluidly coupled in series. A compressor rotor 168 in the compressor section 156 is coupled with a turbine rotor 170 in the turbine section 164 by a shaft 172, which rotates about the centerline/rotational axis 32 of the turbine engine 152.

The engine assembly 20 may be configured for a gas turbine engine as described above. This gas turbine engine may be configured for propulsion and/or power generation. The gas turbine engine may be a geared turbine engine which includes a gear train connecting one or more shafts to one or more rotors in a fan section, a compressor section and/or any other engine section. Alternatively, the gas turbine engine may be a direct-drive turbine engine configured without a gear train. The gas turbine engine may be configured as a single spool or a multi-spool turbine engine. The gas turbine engine may be configured as a turbofan engine, a turbojet engine, a propfan engine, a pusher fan engine, a turboprop engine, a turboshaft engine, an open rotor engine, an auxiliary power unit (APU), an industrial turbine engine or any other type of gas turbine engine. The present disclosure, however, is not limited to any particular types or configurations of gas turbine engines. Furthermore, the engine assembly 20 may alternatively be configured with various other types of internal combustion engines. For example, the engine structure 21 may be configured as a case, a block, a head or another component of a reciprocating piston engine, a rotary engine, or any other type of engine where fuel is continuously or periodically injected into chamber or another internal volume for combustion.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an engine, comprising:
an engine structure comprising an injector receptacle and a fuel supply passage, the injector receptacle extending longitudinally through the engine structure along a centerline, the injector receptacle comprising an injector aperture and a protrusion aperture, and the fuel supply passage extending laterally within the engine structure to the injector aperture; and
a fuel injector mated with the injector receptacle, the fuel injector comprising a nozzle passage, a nozzle orifice, a base and a protrusion, the nozzle passage extending longitudinally along the centerline within the fuel injector to the nozzle orifice, the nozzle passage fluidly coupled with the fuel supply passage, the base extending longitudinally along the centerline in the injector aperture, the protrusion formed integral with the base, and the protrusion projecting laterally out from the base into the protrusion aperture;
the fuel injector configured to translate longitudinally along the centerline when being inserted into the injector receptacle;
wherein the protrusion aperture is a first protrusion aperture, and the infector receptacle further comprises a second protrusion aperture;
wherein the protrusion is a first protrusion, and the fuel injector further comprises a second protrusion; and
wherein the second protrusion is formed integral with the base, and the second protrusion projects laterally out from the base into the second protrusion aperture.

2. The assembly of claim 1, wherein
the fuel injector comprises a splash plate; and
the fuel injector is configured to receive fuel from the fuel supply passage within the nozzle passage, and direct the fuel out of the nozzle passage through the nozzle orifice to impinge against the splash plate.

3. The assembly of claim 1, wherein
the fuel injector further comprises a head connected to the base; and
the head is abutted longitudinally against a surface of the engine structure.

4. The assembly of claim 1, wherein the first protrusion and the second protrusion are longitudinally aligned along the centerline.

5. An assembly for an engine, comprising:
an engine structure comprising an injector receptacle, the injector receptacle extending longitudinally through the engine structure along a centerline;
a fuel injector received by the injector receptacle, the fuel injector including a fuel nozzle and a splash plate, and the fuel nozzle configured to direct fuel out of the fuel injector to impinge against the splash plate; and
a fastener projecting laterally through a sidewall of the engine structure into the fuel injector to secure the fuel injector to the engine structure;
wherein the engine structure further comprises a fuel supply passage extending laterally within the engine structure to the injector receptacle;
wherein the fuel injector comprises a nozzle passage and a nozzle orifice in the fuel nozzle, the nozzle passage extends longitudinally along the centerline within the fuel injector to the nozzle orifice, and the nozzle passage is fluidly coupled with the fuel supply passage;
wherein the injector receptacle extends longitudinally through the engine structure along the centerline between a first end and a second end; and
wherein the fuel supply passage extends laterally within the engine structure to an intermediate region of the injector receptacle located longitudinally along the centerline between the first end and the second end.

6. The assembly of claim 5, wherein
the splash plate comprises a planar splash plate surface; and the fuel nozzle is configured to direct the fuel out of the fuel injector to impinge against the planar splash plate surface.

7. The assembly of claim 5, wherein
the fuel nozzle is configured to direct the fuel out of the fuel injector along a trajectory to impinge against a surface of the splash plate; and
the surface of the splash plate is angularly offset from the trajectory by an obtuse angle.

8. The assembly of claim 5, wherein the fuel injector is configured to be installed with or removed from the engine structure completely from an exterior of the engine structure.

9. The assembly of claim 5, wherein the fuel injector is configured to translate longitudinally along, without rotation about, the centerline when received by the injector receptacle.

10. The assembly of claim 5, wherein
the fuel injector includes a base and a head connected to the base;
the base projects longitudinally along the centerline into the injector receptacle; and
the head is abutted longitudinally against a surface of the engine structure.

11. The assembly of claim 10, wherein the fuel injector further includes a protrusion projecting laterally out from the base into an aperture in the engine structure.

12. The assembly of claim 1, wherein the fuel injector further includes a fuel coupler within the injector receptacle adjacent the fuel supply passage, and the fuel coupler is configured to fluidly couple the fuel supply passage with the nozzle passage.

13. The assembly of claim 12, wherein
the fuel coupler includes a tubular sidewall and a chamber within the tubular sidewall;
a port extends laterally through the tubular sidewall, and the port is at least partially aligned with an orifice to the fuel supply passage; and
the chamber is fluidly coupled with and between the port and the nozzle passage.

14. The assembly of claim 5, wherein
the engine comprises a gas turbine engine; and
the engine structure is configured as a case of the gas turbine engine.

* * * * *